United States Patent [19]

Hubbard

[11] 4,430,734
[45] Feb. 7, 1984

[54] DEMULTIPLEXER CIRCUIT

[75] Inventor: William M. Hubbard, Colts Neck, N.J.

[73] Assignee: Bell Telephone Laboratories, Incorporated, Murray Hill, N.J.

[21] Appl. No.: 330,462

[22] Filed: Dec. 14, 1981

[51] Int. Cl.³ .......................... H04J 3/16; H04M 3/56
[52] U.S. Cl. ...................................... 370/112; 370/62; 179/18 BC
[58] Field of Search ................... 370/86, 89, 112, 62, 370/84; 179/18 BC, 1 CN, 18 AD

[56] References Cited

U.S. PATENT DOCUMENTS

| | | | |
|---|---|---|---|
| 3,867,579 | 2/1975 | Colton et al. | 370/102 |
| 4,190,742 | 2/1980 | Southard | 370/62 |
| 4,190,744 | 2/1980 | Frank | 370/62 |
| 4,280,216 | 7/1981 | Zeitrag | 370/62 |
| 4,313,198 | 1/1982 | Mazzocchi | 370/112 |
| 4,317,198 | 2/1982 | Johnson | 370/112 |
| 4,342,111 | 7/1982 | Busson | 370/62 |
| 4,359,603 | 11/1982 | Heaton | 370/62 |
| 4,377,861 | 3/1983 | Huffman | 370/112 |

OTHER PUBLICATIONS

"Speeding the Delivery of Data Communications" by W. P. Michaud, Jr. and S. Narayanan, Bell Laboratories Record, Jun. 1979, pp. 163–168.

Primary Examiner—Gerald L. Brigance
Attorney, Agent, or Firm—John K. Mullarney; Erwin W. Pfeifle

[57] ABSTRACT

A demultiplexer circuit which extracts from an incoming time division multiplexed digital bit stream any combination of PCM encoded words (in separate channels), or data bits irrespective of the rate of the latter or the position of the data bits in a given channel. The demultiplexer circuit includes a random access memory (12) (RAM) for storing information as to the channel(s) to be demultiplexed out of the incoming digital bit stream. A counter (13) operates in synchronism with the received bit stream and the output thereof serves to access the RAM to provide output signals indicative of the channel(s) carrying information for the subscriber station. These output signals are utilized to read the digital signals intended for said station into a shift register (16). A summing circuit (17, 18) is interconnected with the register so that conference calls are summed in real time. Before the next frame of digital signals, the contents of the register are transferred to a second shift register (21). The digital signals are then read out of the second register at a steady rate, with a stored data signal being similarly outputted irrespective of the rate of the same or its position in a given channel.

7 Claims, 1 Drawing Figure

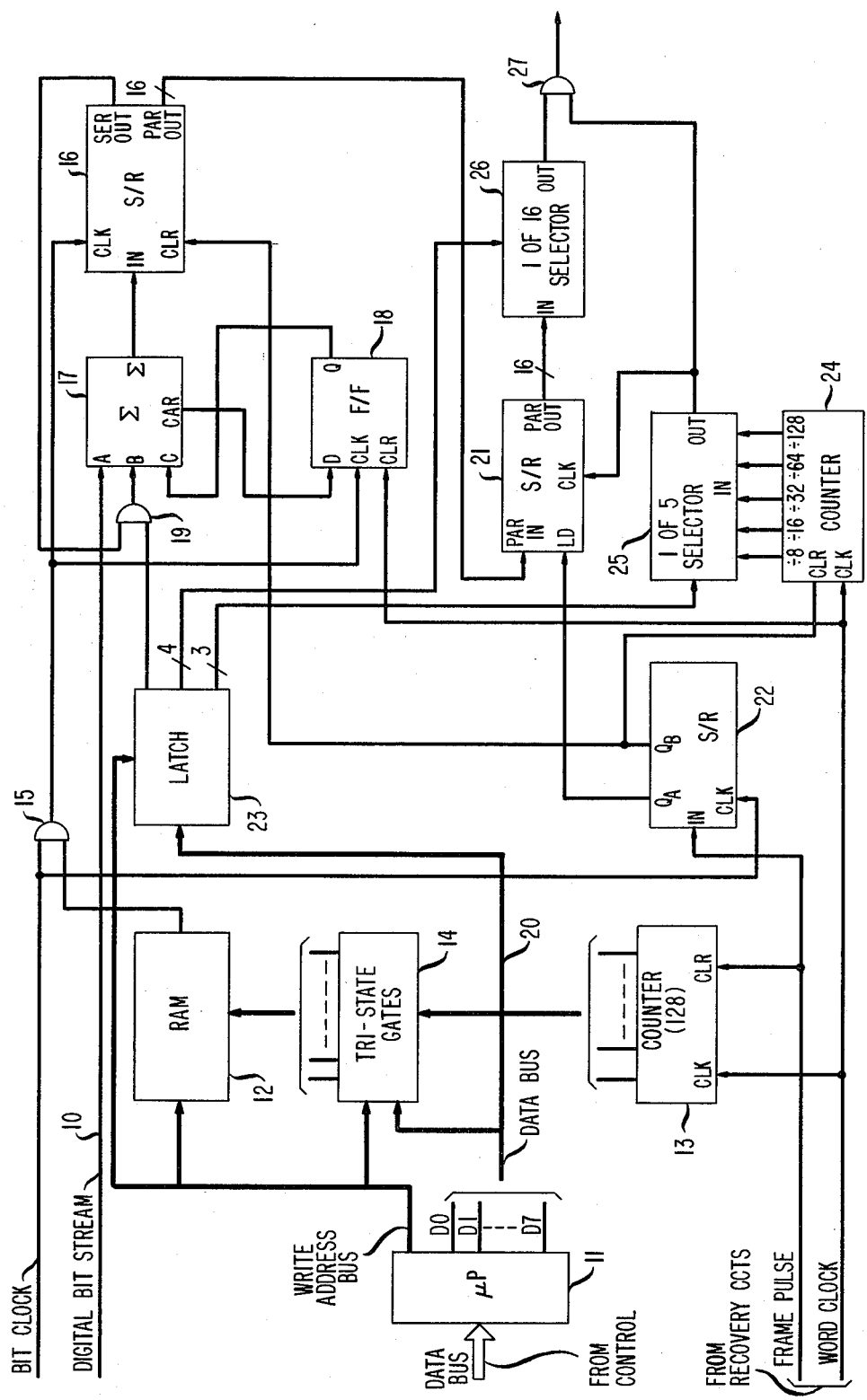

DEMULTIPLEXER CIRCUIT

TECHNICAL FIELD

The present invention relates to digital transmission systems and, more particularly, to a demultiplexer circuit for extracting from an incoming time division multiplexed digital bit stream any combination of PCM encoded words (in separate channels), or data bits irrespective of the rate of the latter or the position of the data bits in a given channel.

BACKGROUND OF THE INVENTION

A proposed digital transmission system consists of digitally encoded voice signals transmitted in time division multiplexed channels with plural channels devoted to conference calls between three or more (up to 128) conferees. The system also proposes the transmission of data at rates up to 128 kB/s. It permits the allocation of 1, 2, ... data bits to a data subscriber in a chosen channel while allocating other bits of the same channel to other and different data subscribers.

Digital transmission systems that carry both PCM (pulse code modulated) voice signals and data at multiple data rates (i.e., 2.4, 4.8 and 9.6 kB/s) are, of course, known in the art; e.g., see the article "Speeding the Delivery of Data Communications" by W. P. Michaud, Jr. and S. Narayanan, Bell Laboratories Record, June 1979, pp. 163-8. The various prior art approaches share one or more of the shortcomings of the apparatus described in the cited article. For example, in the cited article, special plug-in units—called data-ports—are dedicated to a given input data terminal. A dataport is really a specialized channel unit of a channel bank, such as the D3 or D4. A dataport converts input 2400, 4800 or 9600 bit-per-second (bps) data signals into a 64,000 bps digital signal (8 bits per time slot, repeated at an 8 KHz rate). Thus, there is an inherent redundancy in the group of bits in each time slot. Further, for example, if a 9600 bps data signal is transmitted, each eight bit word of data is repeated five times. Such an approach is, of course, wasteful in terms of bandwidth. And the dedicated channel unit approach limits a transmission channel to one and only one input data signal during a given connection.

One of the stumbling blocks in achieving a more flexible approach, in the transmission of PCM encoded voice (especially in the case of conference calls) and multiplexed variable rate data signals, lies in the problem of extracting (only) the desired signal(s) from the multiplexed bit stream. This extraction operation—or demultiplexing—is particularly troublesome should one desire to use the multiple bits of a chosen channel for different data at different rates.

SUMMARY OF THE INVENTION

The present invention relates to a demultiplexer for the aforementioned proposed transmission system. The demultiplexer apparatus is capable of extracting any PCM word or any combination of words (i.e. channels) from a time division multiplexed digital bit stream, irrespective of the time slot location and number of such words. It also permits the summing of all the words devoted to a conference call with very little additional circuitry. And, it is capable of extracting the data bits for a given data station irrespective of the rate of the same or the position of the data bits in a given channel. This, of course, without alteration of the data bits intended for other and different data stations.

In a preferred embodiment of the invention demultiplexer apparatus comprises a (random access) memory that stores the information as to the channel(s) to be demultiplexed out of an incoming time division multiplexed digital bit stream. A counter operates in synchronism with the received bit stream and the output thereof serves to access the memory to provide output signals indicative of the channel(s) carrying information for the given station. These output signals are used to read the digital signals intended for said given station into a (shift) register. Summing circuitry is interconnected with the register so that conference calls are summed in real time. Before the next frame of digital signals, the contents of said register are transferred to a second (shift) register. The digital signals are then read out of the second register at a steady rate, with a stored data signal being similarly output irrespective of the rate of the same or its position in a given channel.

BRIEF DESCRIPTION OF THE DRAWING

The single FIGURE is a detailed block diagram of a demultiplexer circuit in accordance with the principles of the present invention.

DETAILED DESCRIPTION

To facilitate a comprehension of the present invention, the aforementioned proposed digital transmission system will be described briefly. The proposed system is particularly advantageous for use in a dedicated loop network, such as used by a corporation that comprises multiple, geographically removed, locations. In such a loop network, besides the normal one-to-one interconnections between subscribers, conference connections between an unrestricted number of conferees is desirable. It is also essential that data terminals, typically operating at multiple data rates, be interconnected in as flexible a manner as possible.

The digital bit stream of this time division multiplexed transmission system comprises a repetitive frame consisting of W words or channels, each of which consists of B bits (e.g. W=128, B=16). The sampling rate is 8 kHz, and a frame is 125 $\mu$sec in duration. The system codes voice samples as linear PCM. This is advantageous in that conferencing can be done digitally by adding together the voice samples of all the participants before decoding. In addition, the 16 bit words can be used for transmitting data at rates of 128 kB/s or less. It permits the allocation of 1, 2, . . . 16 of the bits of a chosen channel to a given data terminal, while allocating other bits of the same channel to other data terminals operating at the same or different rates. Selection of conferencing or data mode, of data rate, and of which bits to usse for "subrate data" are processor controllable and dynamically assignable.

The demultiplexer circuit of the invention will be described in terms of the frame format set forth above, wherein a frame consists of 128 channels or time slots with 16 bits per channel for carrying 16 bit linear PCM or subrate data at one or more different rates. It is to be understood, however, that the foregoing system description is only for the purpose of facilitating an understanding of the demultiplexer circuit of the invention. It should be evident to those in the art that the present invention is in no way limited to the described system (or frame format) and can find utility in other and different transmission systems.

Referring now to the drawing, there is shown a demultiplexer circuit in accordance with the present invention. Except for the microprocessor 11, which can be time-shared by a number of localized subscriber stations or terminals, the apparatus shown in the drawing is dedicated to one, and only one, subscriber terminal. However, this subscriber terminal may be operating in any one of several different modes—e.g., conferencing or data mode.

A centralized control of central processor (not shown) performs all of the normal functions encountered in setting-up and in taking-down a given call, be it PCM voice or data. The request for service, type of service designation, ringing, etc. are handled by the central control in the usual and customary manner. The necessary supervision and signaling between the various subscribers and the centralized control can be carried out using a dedicated channel of the frame. Alternatively, the requisite supervision and signaling can be carried out over a Common Channel Interoffice Signaling Link, such as that now in use in the telephone industry. Neither the specific controller operations nor the necessary signaling are germane to the present invention and are considered to be sufficiently established and well known as to render unnecessary further discussion herein.

The requisite supervision and signaling information from the controller is delivered to microprocessor 11. This information will indicate if the transmission is from a single PCM encoded voice subscriber or, alternatively, is a conference call involving three or more subscribers (up to a maximum of 127 conferees), as well as the channel(s) being used for the same. If the incoming transmission is data, the microprocessor is informed as to the rate thereof, the channel occupied by the incoming data bits, and the exact (juxtaposed) location of the data bits in the channel. The microprocessor 11 translates or converts the data received from control into the output signals to be described hereinafter. This translation is quite straightforward.

The random access memory 12 (RAM) is used to store the information as to the channel (or channels for a conference call) to be demultiplexed out of the incoming time division multiplexed digital bit stream on lead 10. The RAM has a storage capacity at least equal to the number of time division multiplexed words or channels. For this purpose, a small capacity RAM can be used or, alternatively, a portion of a large capacity RAM might be used with the remaining capacity of the same utilized for other and different purposes. Thus, the RAM has 128 storage locations which are associated with or related to the 128 channels of the received bit stream. When the received transmission, in one or more channels, is intended for a given subscriber station a binary one ("1") is stored in the corresponding storage location(s) in the RAM. That is, a "1" in bit location k (k=0 to 127) signifies that the digital signal in word k is to be multiplexed out of the received bit stream.

The D0–D7 output from the microprocessor 11 loads the RAM. The D0–D6 bits provide the necessary address information and D7=0 or 1. When a given word is to be multiplexed out of the received digital signal, the D0–D6 bits select the corresponding storage location in the RAM and D7 is set to 1. When the write address bus is subsequently and temporarily enabled the D0–D7 signals are coupled to the RAM via the tri-state gates 14 and the described write-in is carried out in a conventional fashion. For a conference call, a binary one would, of course, be stored in multiple RAM storage locations—corresponding to the channels being utilized by the conferees. When a call is ended, the above-described operation is repeated with D7 then set to "0".

With the RAM 12 appropriately loaded with 1s in the address locations corresponding to words to be multiplexed out of the received digital bit stream and 0s in all the other address locations, the 7-bit counter 13 serves to access the RAM to provide output signals indicative of the channel(s) carrying information for the given station. The 7-bit counter 13 counts to 128 and then recycles in synchronism with the received digital bit stream. The recovery circuits (not shown) recover the framing pulses and generate synchronous bit clock pulses, and from the latter synchronous word clock pulses are derived. Such recovery circuits are standard and well known in the art; see the patent to J. R. Colton and H. Mann, U.S. Pat. No. 3,867,579, issued Feb. 18, 1975. A frame pulse signal is delivered to the clear (CLR) input of counter 13 and the word clock signals are delivered to the clock (CLK) input so that the counter 13 counts in word synchronism with the incoming bit stream. The 7-bit output of counter 13 is delivered to the RAM (as a read signal) via the tri-state gates 14. Thus, the 128 storage locations of the RAM are sequentially accessed and if a "1" is encountered during this operation an output signal from the RAM is indicative of the fact that the corresponding channel of the incoming bit stream is carrying information for this station. The counter continually accesses the RAM in the described manner, but this operation is momentarily and arbitrarily interrupted whenever new data from the microprocessor 11 is to be written into RAM.

The output from the RAM 12 comprises one or more pulses per frame, each of a duration equal to a time slot or channel duration. The RAM output is delivered to AND gate 15, as is the bit clock pulses from the recovery circuitry (not shown). The AND gate output consists of one or more 16-bit comb clock signals in synchronism with 16-bits of one or more words of interest to the subscriber station. The 16-bit comb clocks from AND gate 15 are used to read the word(s) of interest in the incoming digital bit stream into the shift register 16. To this end, the output of AND gate 15 is delivered to the clock (CLK) input of register 16. The digital bit stream on lead 10 is coupled to the input of the register 16 via the summing circuit 17. Leaving the summer 17 aside for the moment, it will be evident that only when the shift register 16 is clocked by the 16-bit comb clocks from gate 15 will bits of the digital bit stream be read into the shift register. In this manner, only the word or words of interest will be stored in the register 16. At the beginning of the next frame, the shift register 16 is cleared by a pulse delivered to its clear (CLR) input from shift register 22. However, prior to this clear, the 16-bits of the stored word are transferred in parallel to the shift register 21.

The recovered frame pulse is coupled to the input (IN) of shift register 22 which is clocked at the bit rate. Accordingly, at the beginning of a frame, the frame pulse is clocked into the register 22. This enables the output lead $Q_A$, which is coupled to the load (LD) terminal of register 21; as a result, the word stored in register 16 is transferred to register 21. The occurrence of the next bit clock shifts the stored pulse to the next stage of the shift register 22 and the $Q_B$ output lead is thus enabled and serves to clear the register 16. The above described load and clear operations take place during the first time slot or channel of a frame, which is reserved for either signaling or framing purposes.

Another and different signal on the write address bus serves to enable the latch 23 to receive data bits D0–D7 from the microprocessor 11. The data bits delivered to the latch 23 are, of course, different from the D0–D7 data bits delivered to the RAM. That is, the DATA BUS 20 is time shared to deliver different data to different circuit components at different times. The D0–D7 data bits delivered to latch 23 advise the latch that the incoming message is a conference call and therefore the AND gate 19 should be enabled. Alternatively, it will advise the latch that the incoming message is from a data terminal; it also tells the latch 23 the data rate thereof and the exact position of the juxtaposed data bits in the chosen word or channel.

The AND gate 19 is normally disabled, but is enabled by an output signal from the latch 23 when a conference call is indicated. The summing circuit 17 and the "D" type flip-flop 18 are interconnected with the shift register 16 so that conference calls are carried out (i.e., summed) in real time. That is, multiple conferees in separate and distinct time slots are conference connected by digitally adding together the linearly encoded voice samples of all the participants prior to decoding. Since the shift register 16 is of 16-bit capacity there is little likelihood of "saturation" in the conference mode.

The conferencing or summing operation is carried out in the following manner. Assume first that a digital word is already stored in the shift register 16. The first bit of this word is in the last stage of the shift register 16 and it is coupled back to the B input of the summing circuit 17 via the enabled AND gate 19. With the arrival of the next word of interest (i.e., the encoded word of another conferee), which is applied to the A terminal of the summing circuit, the A and B binary bit inputs will be added and the result thence shifted into the input stage of shift register 16. This binary addition is repeated 16 times so that the binary bits of the stored word are successively added to said next word of interest. Thus, there is now stored the cummulative sum of two conferees. If there are additional conferees, occupying subsequent time slots, the binary bits of the same are added to the cummulative sum stored in the shift register 16. However, as will be appreciated by those skilled in the art, if the A and B binary bit inputs are both a binary one, the sum is a binary zero and a "carry" operation is called for. In this instance, the carry (CAR) output of the summing circuit 17 is coupled to the D input of the flip-flop 18. Thus, a carry bit is temporarily stored in the flip-flop 18. The Q output of this flip-flop is coupled to the C input of the summing circuit so that it is accounted for in the summing operation. The flip-flop 18 is clocked at the bit rate by the output from gate 15, and it is cleared (CLR) for each new word. The summing circuit 17 is not a clocked device; circuits for performing such a binary addition are available commercially.

The following table may be of value in understanding the operation of the summing circuit 17.

| No. of 1s on A, B and C inputs | Output to register 16 | Output to flip-flop 18 |
|---|---|---|
| 0 | 0 | 0 |
| 1 | 1 | 0 |
| 2 | 0 | 1 |
| 3 | 1 | 1 |

The $Q_B$ output of shift register 22 is also used to clear (CLR) the counter 24. This is a 7-bit counter that counts to 128 and then recycles. Counter 24 is clocked by the input word clock pulses from the recovery circuitry. The counter 24 provides five separate outputs to the 1-of-5 selector 25. The ÷128 output provides a single output signal once per frame; the ÷64 output provides two output signals per frame; the ÷32 output provides 4 output pulses per frame; the ÷16 offers 8 pulses per frame; and the ÷8 output provide 16 output pulses each frame. These output signals are used to clock the shift register 21 at one of five different rates. The ÷128 output provides an 8 kHz clock rate; the ÷64 output provides a 16 kHz clock rate; and the remaining outputs provide clock rates of 32, 64 and 128 kHz, respectively. These clock rates correspond to transmitted data rates. For example, if a data terminal makes use of a single bit in a given word or channel, the transmission rate is 8 kHz (note, this is the frame rate); whereas, if the data terminal uses all 16 bits of a given word for transmission purposes, the transmitted data rate is 128 kHz (16×8 kHz). Accordingly, data can be transmitted using 1, 2, 4, 8 or all 16 bits of a given channel to transmit data at an 8, 16, 32, 64 or 128 kilobit rate. However, the principles of the present invention are not so constrained. With very moderate, straightforward, circuit modification, data might also be transmitted using 3, 5, 6, 7 or 9 through 15 bits of a word or channel and still be readily extracted by a demultiplexer circuit designed in accordance with the present invention. The only significant changes that this would entail would be the use of a more elaborate, but still state of the art, counter 24 and a 1-of-16 selector for selector 25.

As the name suggests, the 1-of-5 selector 25 selects the clock rate to be applied to the shift register 21. This selection is carried out under the control of the signal from latch 23, which, as previously described, receives the appropriate data rate information from the microprocessor 11. Since there are five possible alternatives in this selection process, a three-lead bus is provided between latch 23 and selector 25.

To store the 16 bits of a word, the shift register 121 comprises 16 stages. The output of each of these stages is connected to the 1-of-16 selector 26. This selector is required since the data bits of a given data message may appear in any arbitrary position in a word or channel, so long as they are immediately adjacent each other. If a 16-bit PCM encoded voice signal or a 16-bit data signal is stored in the shift register 21, the selector 26 merely serves to interconnect the last stage of the register 21 to the output AND gate 27. The register 21 is clocked, as described, at a 128 kHz rate and the stored bits are serially read out of the register at this rate. The stored bits are ANDed with the clock pulses and then delivered to a PCM decoder or data terminal, as the case may be.

For purposes of explanation another example will be chosen. If a data rate of 32 kB/s is assumed, four bits of a given channel will be selected for this data transmission. Further, assume that these four bits are placed in the 4$^{th}$, 5$^{th}$, 6$^{th}$ and 7$^{th}$ bit positions in the chosen channel. After transmission and the above described processing, these four bits will occupy or appear in the 4th, 5th, 6th and 7th stages of shift register 21. As previously described, the microprocessor 11 sends signals to latch 23 indicative of the data rate and the position of the data bits in the given channel. In response thereto, the latch will enable the 1-of-16 selector 26 to pass the bits of the 7th stage of the register 21. That is, the output lead of the seventh stage is coupled via selector 26 to AND gate 27. The stored data bit in this stage is thus read out and as the shift register 21 is clocked, at a 32 kHz rate, the other three bits of the data word are successively transferred into this 7th stage and then read out to AND gate 27.

It will be appreciated by those skilled in the art that a multiplexer circuit is essentially a mirror image of the demultiplexer circuit with which it interacts, remotely. Accordingly, it is to be understood that the principles of the present invention are also applicable to multiplexer circuits except that a multiplexer would not contain the summing circuits used for conferencing.

The above described embodiment is merely illustratively of the principles of the present invention and numerous modifications and variations therein may be devised by those skilled in the art without departing from the spirit and scope of the invention.

What is claimed is:

1. In a digital transmission system wherein digitally encoded voice signals are transmitted in time division multiplexed channels with plural channels being devoted to conference calls between three or more conferees, and data signals of multiple data rates are transmitted using other and different channels, demultiplexer apparatus for said digital transmission system being characterized by memory means (12) having a storage capacity at least equal to the number of time division multiplexed channels, means (11, 14) for storing in said memory means information as to the channel or channels to be demultiplexed out of the incoming transmitted signal, counter means (13) operating in synchronism with the incoming transmitted signal and serving to access the memory means to provide output signals indicative of the channel or channels carrying information for the subscriber station, means (15, CLK of 16) using said output signals to read the digital signals intended for said station into a register means (16), and means (21, 24–27) for reading out the digital signals stored in said register means at a steady rate, said data signals being similarly read out at different but steady rates irrespective of the number of data bits and position of the same in a given channel.

2. In a digital transmission system as defined in claim 1 including means (17, 18) connected with said register means for summing in real time all the conference calls intended for said station, with the cummulative sum being stored in said register means at the end of each frame.

3. In a digital transmission system wherein digitally encoded voice signals are transmitted in time division multiplexed channels with plural channels being devoted to conference calls between three or more conferees, and data signals of multiple data rates are transmitted using other and different channels, demultiplexer apparatus for said digital transmission system being characterized by random access memory means (12) having a storage capacity at least equal to the number of time division multiplexed channels, means (11,14) for storing in said memory means information as to the channel or channels to be demultiplexed out of the incoming transmitted signal, counter means (13) operating in synchronism with the incoming transmitted signal and serving to access the memory means to provide output signals indicative of the channel or channels carrying information for the subscriber station, means (15, CLK of 16) using said output signals to read the digital signals intended for said station into a register means (16), means (17, 18) connected with said register means for summing all the conference calls intended for said station, and means (21, 24–27) for reading out the digital signals stored in said register means at a steady rate, said data signals being similarly read out at different but steady rates irrespective of the number of data bits and position of the same in a given channel.

4. In a digital transmission system wherein digitally encoded voice signals are transmitted in frames of time division multiplexed channels with plural channels being devoted to conference calls between three or more conferees, and data signals of multiple data rates are transmitted using other and different channels, a multiple comb clock generator for use in the multiplexer/demultiplexer apparatus of said digital transmission system and being charcterized by a random access memory (12) having a storage capacity at least equal to the number of time division multiplexed channels, means (11, 14) for storing in said random access memory information as to the channel or channels designated for a particular transmission or call, a counter (13) operating in synchronism with the channels of the time division multiplexed transmission signal, the output of said counter serving to access the random access memory to provide output signals therefrom indicative of said designated channel or channels, gate means (15) for ANDing said output signals with a bit clock signal that is synchronous with the bits of said transmission signal, and a shift register (16) to which the transmission signal is coupled, the output of said gate means serving to clock selected bits of the transmission signal into said shift register.

5. In a digital transmission system wherein digitally encoded voice signals are transmitted in frames of time division multiplexed channels with plural channels being devoted to conference calls between three or more conferees, and data signals of multiple data rates are transmitted using other and different channels, a demultiplexer circuit for said digital transmission system being characterized by
   a random access memory (12) having storage locations equal in number to the number of time division multiplexed channels,
   means (11, 14) for storing in said locations data as to the channel or channels to be demultiplexed out of an incoming transmitted signal,
   a counter (13) operating in synchronism with the incoming transmitted signal and serving to read the random access memory to provide output signals therefrom indicative of the channel or channels carrying information for the subscriber station,
   a gate (15) for ANDing said output signals with a bit clock signal that is bit synchronous with the incoming transmitted signal,
   a shift register (16) for receiving the incoming transmitted signal, the output of said gate serving to clock the desired channel or channels of the incoming transmitted signal into said shift register,
   a summing circuit (17, 18) connected with said shift register to sum in real time all of the conference calls intended for said subscriber station with the cumulative sum being stored in said register at the end of each frame, a second shift register (21) for receiving the contents of the first shift register at the beginning of a frame, and means (24-27) for reading out the digital signals stored in said second register at a steady rate, said data signals being similarly read out at different but steady rates irrespective of the number of data bits and the position of the same in a given channel.

6. A demultiplexer circuit for a time division multiplexed digital bit stream which includes n-bit PCM encoded speech signal(s) and/or one or more data signals at different data rates comprising memory means (12) having a storage capacity at least equal to the number of time division multiplexed channels, means (11, 14) for storing in said memory means information as to the channel or channels to be demultiplexed out of the incoming transmitted signal, counter means (13) operating in synchronism with the incoming transmitted signal and serving to access the memory means to provide output signals indicative of the channel or channels carrying information for the subscriber station, means (15, CLK of 16) using said output signals to read the digital signals intended for said station into a register means (16), and means (21, 24-27) for reading out the digital signals stored in said register means at a steady rate, said data signals being similarly read out at different but steady rates irrespective of the number of data bits and position of the same in a given channel.

7. A demultiplexer circuit as defined in claim 6 including means (17, 18) connected with said register means for summing in real time all the conference calls intended for said station, with the cummulative sum being stored in said register means at the end of each frame.

* * * * *